US012173675B2

(12) United States Patent
Benham et al.

(10) Patent No.: US 12,173,675 B2
(45) Date of Patent: Dec. 24, 2024

(54) PUMP ASSEMBLIES WITH BARREL GUIDING FEATURES

(71) Applicant: Cummins Inc., Columbus, IN (US)

(72) Inventors: Eric A. Benham, Columbus, IN (US); Karthik Sethuraman, Columbus, IN (US); Donald J. Benson, Columbus, IN (US); Michael Andrew Lucas, Columbus, IN (US); Richard E. Duncan, Greenwood, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/497,382

(22) Filed: Oct. 30, 2023

(65) Prior Publication Data

US 2024/0060464 A1 Feb. 22, 2024

Related U.S. Application Data

(63) Continuation of application No. PCT/US2021/030559, filed on May 4, 2021.

(51) Int. Cl.
*F02M 59/36* (2006.01)
*F02M 63/00* (2006.01)

(52) U.S. Cl.
CPC ...... *F02M 59/366* (2013.01); *F02M 63/0017* (2013.01); *F02M 63/0035* (2013.01)

(58) Field of Classification Search
CPC ............. F02M 59/366; F02M 63/0017; F02M 63/0035
See application file for complete search history.

(56) References Cited

U.S. PATENT DOCUMENTS

| | | | |
|---|---|---|---|
| 3,302,582 A | 2/1967 | Siegfried | |
| 5,082,180 A | 1/1992 | Kubo et al. | |
| 5,413,082 A | 5/1995 | Cook et al. | |
| 2003/0047168 A1 | 3/2003 | Frank | |
| 2006/0159573 A1* | 7/2006 | Inoue | F04B 53/10 417/505 |
| 2014/0028422 A1 | 1/2014 | Matsumoto et al. | |
| 2014/0103243 A1* | 4/2014 | Van Himme | F02M 59/366 251/319 |
| 2018/0355830 A1 | 12/2018 | Landenberger | |

FOREIGN PATENT DOCUMENTS

| | | |
|---|---|---|
| DE | 29 03 817 A1 | 7/1980 |
| EP | 0 286 404 B1 | 7/1991 |
| WO | 2018073246 A1 | 4/2018 |

OTHER PUBLICATIONS

International Search Report and Written Opinion, PCT Appln. No. PCTUS211305593, Aug. 5, 2021, 10 pgs.

* cited by examiner

*Primary Examiner* — Jacob M Amick
*Assistant Examiner* — Charles J Brauch
(74) *Attorney, Agent, or Firm* — Taft, Stettinius & Hollister LLP

(57) ABSTRACT

At least some embodiments of the present disclosure are directed to pump assemblies. In some embodiments, the pump is a high-pressure pump for an engine. The pump includes: an inlet valve configured to receive fuel; an armature coupled to the inlet valve and configured to actuate the inlet valve; and a pump barrel comprising a barrel guide, the barrel guide comprising a protrusion and configured to guide a motion of the armature.

20 Claims, 8 Drawing Sheets

PUMP ASSEMBLIES WITH BARREL GUIDING FEATURES

CROSS-REFERENCE TO RELATED APPLICATION

The present application is a continuation of International Patent Application No. PCT/US2021/030559 filed on May 4, 2021, which is incorporated herein by reference.

TECHNICAL FIELD

The present disclosure generally relates to high-pressure pump architecture.

BACKGROUND

In internal combustion engines, one or more fuel pumps deliver fuel to a common rail. Fuel is delivered by fuel injectors from the rail to cylinders of the engine for combustion to power operation of the system driven by the engine. Fuel pumps are typically associated with valves to permit fuel flow into the fuel pump and from the fuel pump to one or more fuel injectors. An accumulator or common rail may be positioned downstream from the fuel pump and upstream from the fuel injectors. One type of valve associated with a fuel pump is an inlet valve, which permits fuel to flow into the fuel pump from a fuel tank. Another type of valve associated with a fuel pump is an outlet check valve, which permits pressurized fuel to flow from the fuel pump to an accumulator or fuel rail or to one or more fuel injectors. These valves are positioned in a fuel pump or in proximity to a fuel pump by way of complex components and assemblies.

Some designs of fuel pumps include an armature for affecting a position of valve(s). Fuel pumps typically include a pump plunger positioned in a bore of a fuel pump barrel and sized so as to permit reciprocating motion within the bore. Pump plungers are driven by a drive system located in a separate mechanical compartment and supplied with lubricating oil.

SUMMARY

In some designs, pump assemblies include an electromagnetically controlled inlet valve to control the opening and closing of the valve. The existing approaches guide the armature in a fuel pump on a feature as a part of the electromagnetic valve sub-assembly which increases the assembled height of the pump assembly. At least some embodiments of the present disclosure reduce the assembly size of these pump assemblies by utilizing the pump barrel to radially guide both the pump plunger and/or the armature of the active inlet valve. Using the barrel to guide the armature has several benefits including, for example: 1) the design may reduce the required axial height of the pump assembly which allows a smaller pump assembly; 2) the design can reduce the number of components; and 3) the design may address the concentricity of the armature relative to the pump plunger and the barrel seat and control the axial displacement of the armature.

As recited in examples, Example 1 is a high-pressure pump for an engine. The pump includes: an inlet valve configured to receive fuel; an armature coupled to the inlet valve and configured to actuate the inlet valve; and a pump barrel comprising a barrel guide, the barrel guide comprising a protrusion and configured to guide a motion of the armature.

Example 2 is the high-pressure pump of Example 1, wherein the barrel guide comprises a first surface conformable with an armature surface of the armature.

Example 3 is the high-pressure pump of Example 2, wherein the inlet valve comprises an inlet plunger; and wherein the barrel guide comprises a second surface conformable with a plunger surface of the inlet valve plunger.

Example 4 is the high-pressure pump of Example 3, wherein the inlet valve comprises an open state allowing fuel to run through the inlet valve and a closed state not allowing fuel to run through the inlet valve; wherein the armature is at a downward position when the inlet valve is at the open state and at an upward position when the inlet valve is at the closed state; and wherein the upward position is closer to a top of the high-pressure pump than the downward position.

Example 5 is the high-pressure pump of Example 4, wherein the inlet valve comprises an inlet plunger stop; and wherein an upper surface of the armature is proximate to the inlet plunger stop when the armature is at the upward position.

Example 6 is the high-pressure pump of Example 5, wherein the inlet valve comprises an inlet valve spring; wherein the inlet valve spring comprises a spring component; and wherein the inlet valve spring is configured to push the armature away from the inlet plunger stop after the armature is at the upward position.

Example 7 is the high-pressure pump of Example 4, wherein the pump barrel comprises a barrel seat; wherein the barrel seat generally conformable with a bottom surface of the armature; and wherein the bottom surface of the armature is proximate to the barrel seat when the armature is at the downward position.

Example 8 is the high-pressure pump of any one of Examples 1-7, wherein the armature comprises an electromagnetic component.

Example 9 is the high-pressure pump of any one of Examples 1-8, further comprising: a stator configured to affect a motion of the armature; wherein the stator comprises an electromagnetic component.

Example 10 is the high-pressure pump of any one of Examples 1-9, further comprising: an outlet check valve assembly configured to allow fuel to flow through when fuel pressure is equal to or greater than a predetermined fuel threshold.

Example 11 is a high-pressure pump for an engine. The pump includes: an inlet valve configured to receive fuel; an armature coupled to the inlet valve and configured to actuate the inlet valve, the armature comprising an armature surface; and a pump barrel comprising a barrel guide, the barrel guide comprising a first surface conforming to a surface of the armature surface and configured to guide a motion of the armature.

Example 12 is the high-pressure pump of Example 11, wherein the barrel guide comprises a protrusion, wherein the protrusion has a height larger than a height of the armature.

Example 13 is the high-pressure pump of any one of Examples 12, wherein the inlet valve comprises an inlet plunger; and wherein the barrel guide comprises a second surface conformable with a plunger surface of the inlet valve plunger.

Example 14 is the high-pressure pump of Example 13, wherein the inlet valve comprises an open state allowing fuel to run through the inlet valve and a closed state not allowing fuel to run through the inlet valve; wherein the armature is at a downward position when the inlet valve is at the open state and at an upward position when the inlet valve is at the closed state; and wherein the upward position is closer to a top of the high-pressure pump than the downward position.

Example 15 is the high-pressure pump of Example 14, wherein the inlet valve comprises an inlet plunger stop; and wherein an upper surface of the armature is proximate to the inlet plunger stop when the armature is at the upward position.

Example 16 is the high-pressure pump of Example 15, wherein the inlet valve comprises an inlet valve spring; wherein the inlet valve spring comprises a spring component; and wherein the inlet valve spring is configured to push the armature away from the inlet plunger stop after the armature is at the upward position.

Example 17 is the high-pressure pump of Example 14, wherein the pump barrel comprises a barrel seat; wherein the barrel seat generally conformable with a bottom surface of the armature; and wherein the bottom surface of the armature is proximate to the barrel seat when the armature is at the downward position.

Example 18 is the high-pressure pump of any one of Examples 11-17, wherein the armature comprises an electromagnetic component.

Example 19 is the high-pressure pump of any one of Examples 11-18, further comprising: a stator configured to affect a motion of the armature; wherein the stator comprises an electromagnetic component.

Example 20 is the high-pressure pump of any one of Examples 11-19, further comprising: an outlet check valve assembly configured to allow fuel to flow through when fuel pressure is equal to or greater than a predetermined fuel threshold.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION

Figure 1A:
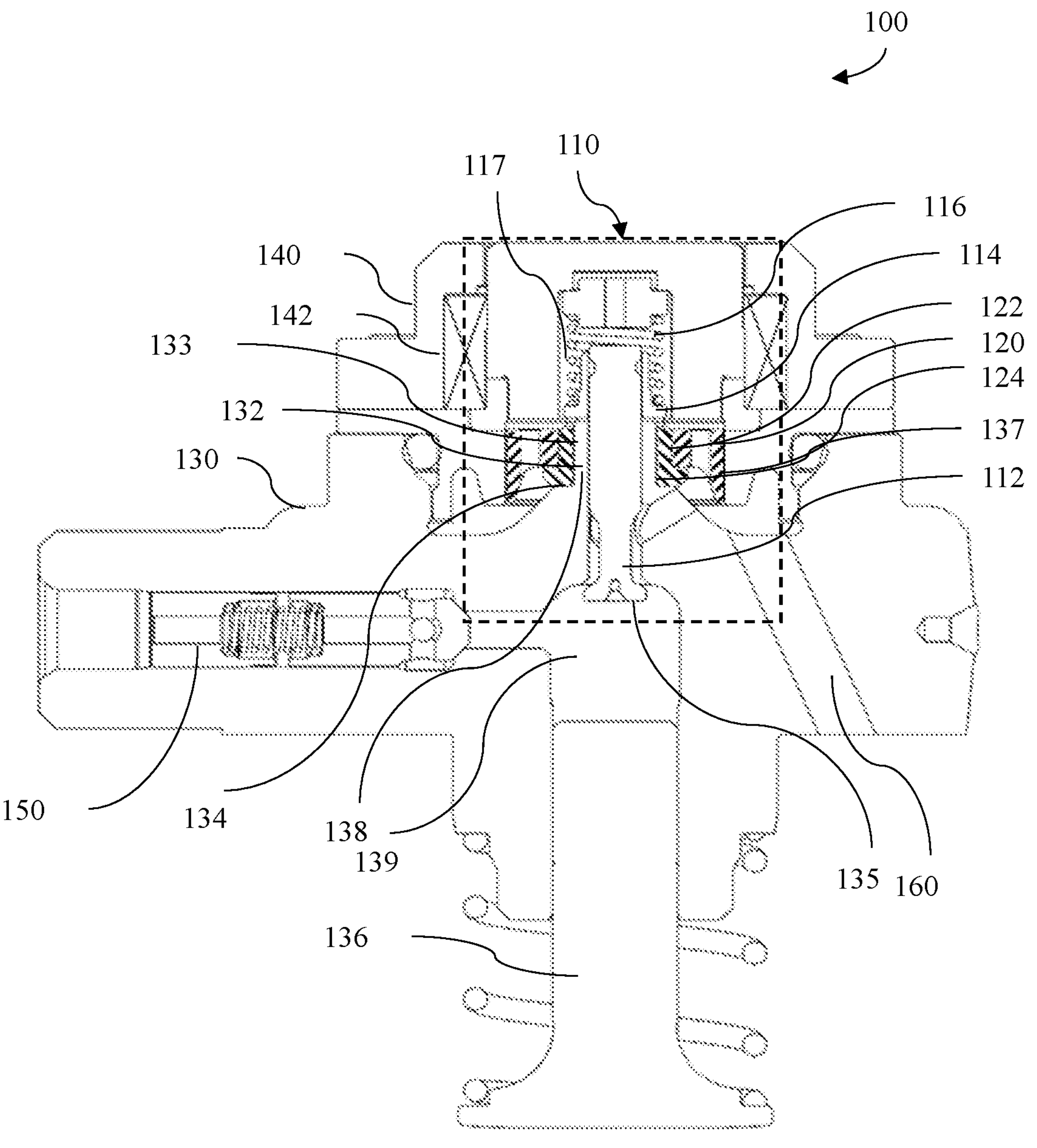
FIG. 1A depicts a cross-sectional schematic view of a part of a pump assembly, also in accordance with certain embodiments of the disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, when an element, component, device or layer is described as being "on" "connected to," "coupled to" or "in contact with" another element, component, device or layer, it can be directly on, directly connected to, directly coupled with, in direct contact with, or intervening elements, components, devices or layers may be on, connected, coupled or in contact with the specific element, component or layer, for example. When an element, component, device or layer for example is referred to as being "directly on," "directly connected to," "directly coupled to," or "directly in contact with" another element, component, device or layer, there are no intervening elements, components, devices or layers for example.

Although illustrative methods may be represented by one or more drawings (e.g., flow diagrams, communication flows, etc.), the drawings should not be interpreted as implying any requirement of, or specific order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," "series" or "group" of items (e.g., inputs, algorithms, data values, etc.) may include one or more items, and, similarly, a subset or subgroup of items may include one or more items. A "plurality" means more than one.

As used herein, the term "based on" or "based upon" is not meant to be restrictive, but rather indicates that a determination, identification, prediction, calculation, and/or the like, is performed by using, at least, the term following "based on" as an input. For example, predicting an outcome based on a specific piece of information may additionally, or alternatively, base the same determination on another piece of information.

Figure 1B:
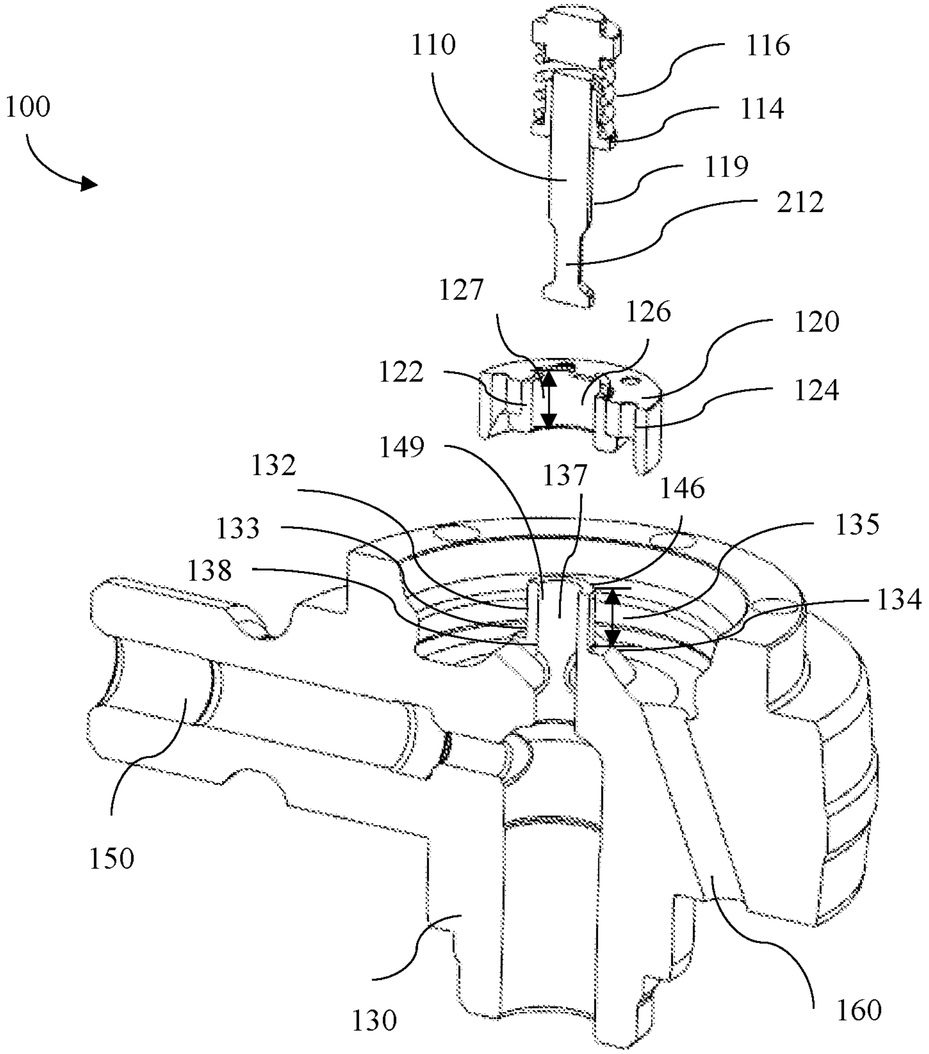
FIG. 1B depicts an exploded sectional schematic view of a pump sub-assembly, in accordance with certain embodiments of the disclosure.

FIG. 1A depicts a cross-sectional schematic view of a part of a pump sub-assembly 100, also referred to as a pump sub-assembly, in accordance with certain embodiments of the disclosure; and FIG. 1B depicts an exploded sectional schematic view of a pump sub-assembly 100, in accordance with certain embodiments of the disclosure. In some implementations, one or more components of the pump subassembly 100 can be optional. In some implementations, the pump sub-assembly 100 can include other components not illustrated in the diagram. In some embodiments, the pump sub-assembly 100 is a part of a high-pressure pump configured to generate fuel pressure approximate to 2500 bar. In the illustrated example, the pump sub-assembly 100 includes an inlet valve 110, an armature 120, a pump barrel 130, a stator 140, an outlet check valve 150, and a flow passage 160.

The inlet valve 110 is configured to be opened to allow fuel to flow through and be closed to stop fuel from flowing through. In some implementations, the inlet valve 110 includes an inlet valve plunger 112, an inlet valve plunger stop 114, and an inlet valve spring 116. In some examples, the inlet valve 110 is adjacent to the stator 140, where the stator 140 comprises an electromagnetic component (e.g., coil, solenoid, etc.)

In some embodiments, the pump barrel 130 includes a barrel guide 132, a barrel seat 134, and a barrel plunger 136. In some examples, the barrel guide 132 includes a protrusion 133 extended from the barrel seat 134. In some cases, the barrel guide 132 and/or the protrusion 133 includes an armature guide 137 that is configured to guide a motion of the armature. In some cases, the barrel guide 132 and/or the armature guide 137 includes a first surface 146 conformable with an armature surface 126 of the armature 120. In some cases, the barrel guide 132 and the protrusion 133 includes a plunger guide 138 that is configured to guide a motion of the inlet valve plunger 112. In some cases, the barrel guide 132 and/or the plunger guide 138 includes a second surface 149 conformable with a plunger surface 119 of the inlet valve plunger 112.

In the example as illustrated in FIGS. 1A and 1B, the armature 120 is shown as a cross-hatched assembly of two subcomponents: an inner section 122 and an outer section 124. In some cases, the inner section 122 is guided on an outer surface of the barrel guide 132 and/or the armature guide 137. In some cases, the barrel guide 132 and/or the armature guide 137 includes the first surface conformable with the armature surface of the inner section 122 of the armature 120. In some cases, the outer section 124 provides a majority of the electromagnetic force of the armature 120. In some implementations, the armature 120 is a single piece armature. In some designs, the armature 120 has a height 127, measured at the armature surface.

In some examples, the barrel guide 132 has a height 135, measured from the barrel seat 134. In some designs, the height 135 of the barrel guide 132 is larger than a height 127 of the armature 120. In certain designs, the height 127 of the armature 120 is a height of the armature 120 proximate to the inlet valve 110. In some designs, the height 135 of the barrel guide 132 is smaller than the height 127 of the armature 120. In certain designs, the difference between the height 135 of the barrel guide 132 and the height 127 of the armature 120 is small to provide sufficient guiding function while maintaining a small gap. In some examples, the difference between the height 135 of the barrel guide 132 and the height 127 of the armature 120 is no larger than 50% of the height 135 of the barrel guide 132. In some examples, the difference between the height 135 of the barrel guide 132 and the height 127 of the armature 120 is no larger than 20% of the height 135 of the barrel guide 132. In some examples, the difference between the height 135 of the barrel guide 132 and the height 127 of the armature 120 is no larger than 12% of the height 135 of the barrel guide 132.

In some embodiments, the armature 120 is electromagnetically coupled to the stator 140. The stator 140 is fixed within the pump sub-assembly 100. In some implementations, the bottom surface of the stator 140 is proximate to one end of the armature 120. The stator 140 further includes a coil 142 disposed proximate to the armature 120, wherein the coil 142 has an active state which permits the armature 120 to move to an upward position and an inactive state which permits the armature 120 to move to a downward position. The armature 120 includes an armature surface conformable to the armature guide 137 of the pump barrel 130, such that the armature 120 is guided by a surface of the armature guide 137 as the armature 120 moves between the upward position and the downward position. The inlet valve plunger 112 includes a plunger surface conformable to the plunger guide 138 of the pump barrel 130, such that the inlet valve plunger 112 is guided by a surface of the plunger guide 138 as the inlet valve plunger moves with the armature 120 between the upward position and the downward position.

In some implementations, the inlet valve 110 has an open state allowing fuel to run through the inlet valve and a closed state not allowing fuel to run through the inlet valve, where the armature 120 is at the downward position when the inlet valve 110 is at the open state and the armature 120 is at the upward position when the inlet valve 110 is at the close state. In some cases, the pump sub-assembly 100 includes a top end and a bottom end, where the downward position of the armature 120 is closer to the bottom end than the upward position.

In some embodiments, the outlet check valve 150 is configured to allow fuel to flow through when fuel pressure is equal to or greater than a predetermined threshold. In some examples, an upper surface of the armature 120 is proximate to the inlet valve plunger stop 114 when the armature is at the upward position. In some implementations, the inlet valve 110 includes an inlet valve spring 117, where the inlet valve spring 117 includes a spring component. In some examples, the inlet valve spring 117 is configured to push the armature away from the inlet valve plunger stop 114 after the armature is at the upward position. In some implementations, the barrel seat 134 is generally conformable with a bottom surface of the armature 120. In some examples, the bottom surface of the armature 120 is proximate to the barrel seat 134 when the armature 120 is at the downward position.

During the intake stage of the pump subassembly 100, inlet fuel flows through inlet valve 110 into the pump. Initially, the armature 120 is at the downward position. Fuel under low pressure flows through inlet passage and the force of the low-pressure fuel into the flow passage 160 causes inlet valve plunger 112 to move longitudinally or axially away from inlet valve plunger stop 114, compressing inlet valve spring 116. From flow passage 160, the low-pressure fuel flows into pump chamber 139. When the fuel accumulates in the pump chamber 139, the armature 120 is moving toward the inlet valve plunger stop 114 and the outlet check valve 150 remains closed. When the armature 120 is at the upward position, the inlet valve 110 is closed, the fuel pressure is equal to or greater than a predetermined fuel threshold, and the pump subassembly 100 goes into an output stage.

During the output stage of the pump subassembly 100, high-pressure fuel flows through the outlet check valve 150 and the fuel pressure in the pump chamber 139 is reduced. The inlet valve spring 116 starts to push the armature 120 toward the barrel seat 134. When the armature 120 reaches the downward position, the inlet valve is opened and the outlet check valve 150 is closed.

Figure 2A:
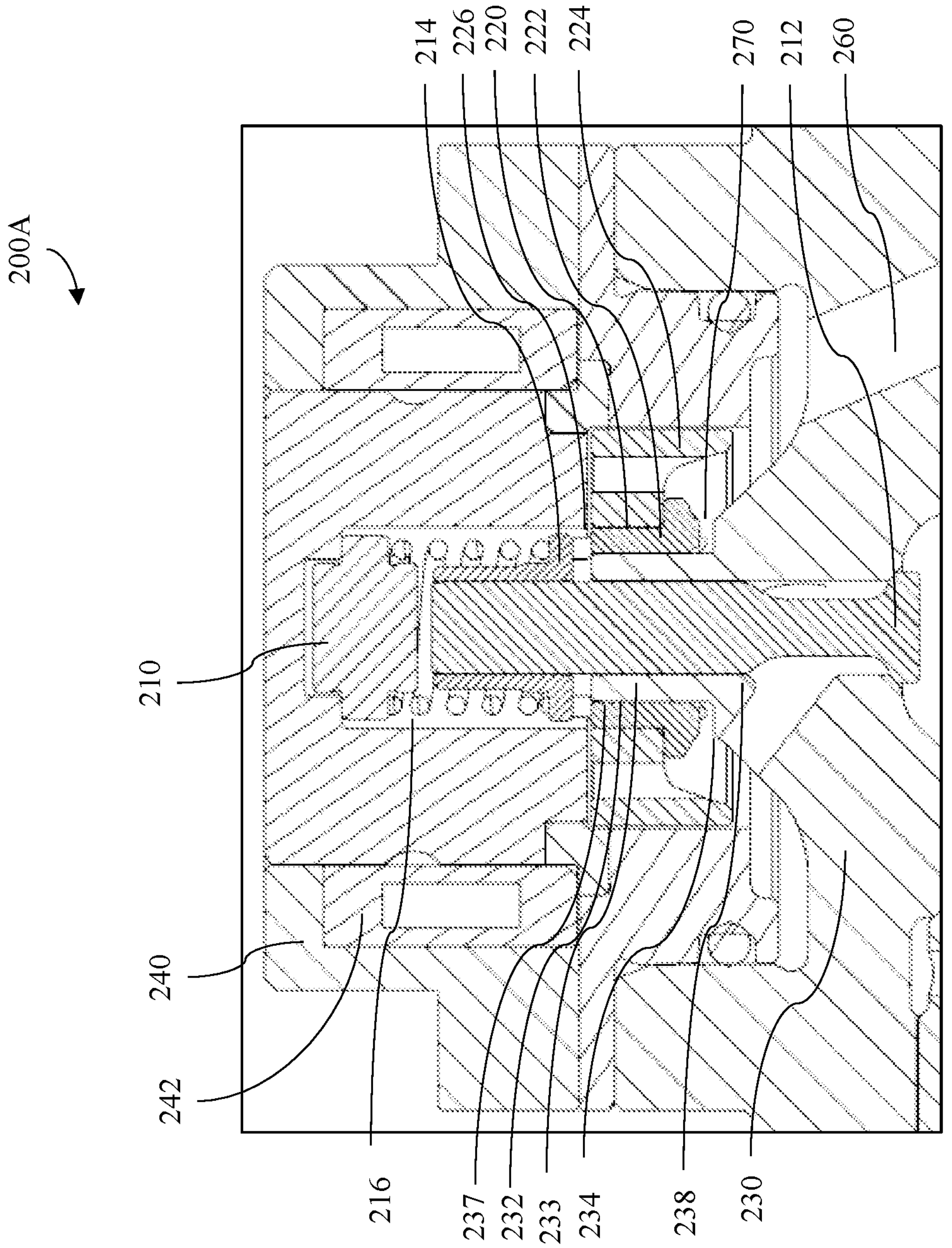
FIG. 2A depicts a cross-sectional schematic view of a pump sub-assembly with an inlet valve in a closed state, in accordance with certain embodiments of the disclosure.
Figure 2B:
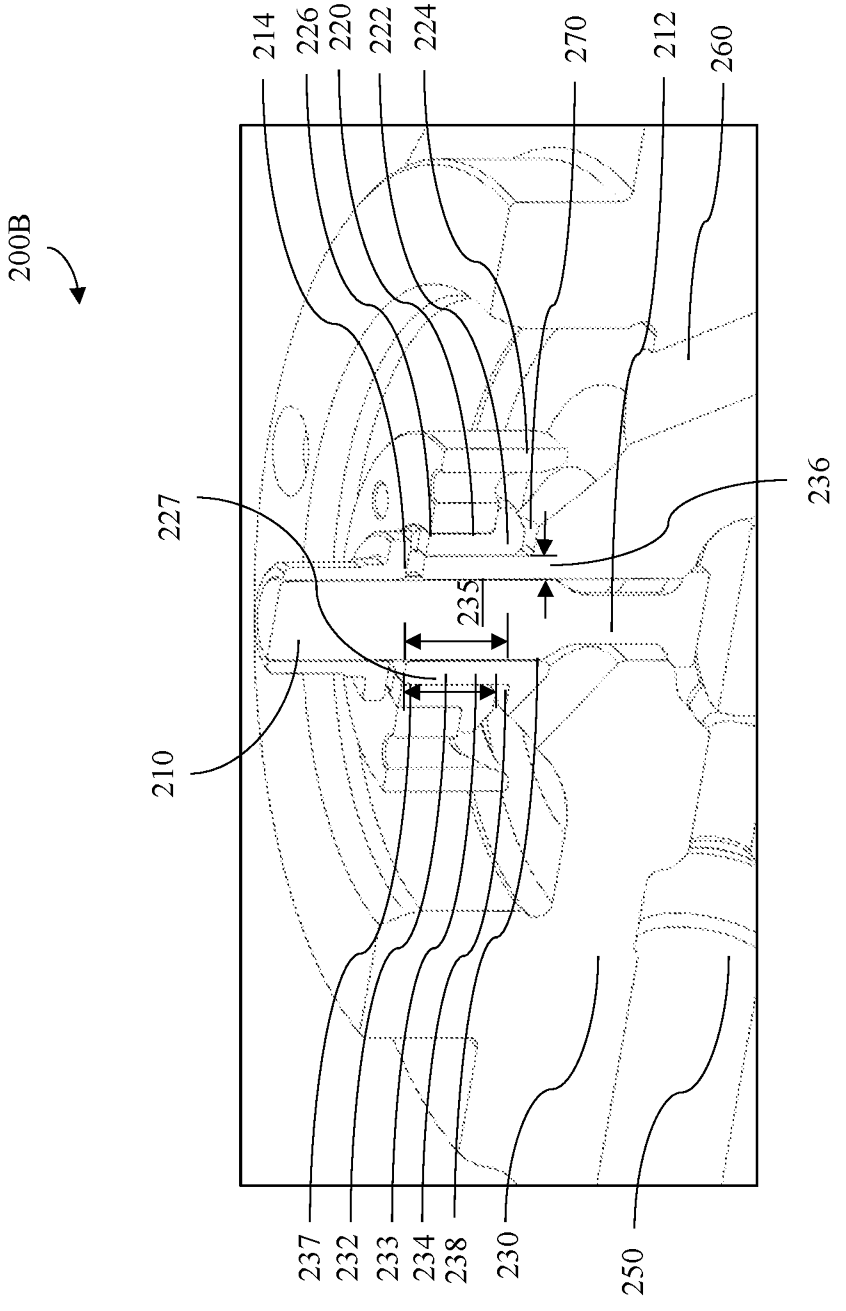
FIG. 2B depicts a perspective schematic view of a pump sub-assembly with an inlet valve in a closed state, in accordance with certain embodiments of the disclosure.

FIG. 2A depicts a cross-sectional schematic view of a pump sub-assembly 200A with an inlet valve in a closed state, in accordance with certain embodiments of the disclosure. FIG. 2B depicts a perspective schematic view of a pump sub-assembly 200B with an inlet valve in a closed state, in accordance with certain embodiments of the disclosure. In some implementations, one or more components of the pump sub-assembly 200A and 200B can be optional. In some implementations, the pump sub-assembly 200A and 200B can include other components not illustrated in the diagram. In some embodiments, the pump sub-assembly 200A and 200B is a part of a high-pressure pump configured to generate fuel pressure approximate to 2500 bar. In the illustrated examples, the pump sub-assembly 200A and 200B includes an inlet valve 210, an armature 220, a pump barrel 230, a stator 240, an outlet check valve 250, and a flow passage 260.

In FIG. 2A, the inlet valve 210 is closed to stop fuel from flowing through. In some implementations, the inlet valve 210 includes an inlet valve plunger 212, an inlet valve plunger stop 214, and an inlet valve spring 216. In some examples, the inlet valve 210 is adjacent to the stator 240, where the stator 240 comprises an electromagnetic component (e.g., coil, solenoid, etc.)

In some embodiments, the pump barrel 230 includes a barrel guide 232 and a barrel seat 234. In some examples, the barrel guide 232 includes a protrusion 233 extended from the barrel seat 234. In some cases, the barrel guide 232 and/or the protrusion 233 includes an armature guide 237 that is configured to guide a motion of the armature. In some cases, the barrel guide 232 and/or the armature guide 237 includes a first surface conformable with an armature surface of the armature 220. In some cases, the barrel guide 232 and the protrusion 233 includes a plunger guide 238 that is configured to guide a motion of the inlet valve plunger 212. In some cases, the barrel guide 232 and/or the plunger guide 238 includes a second surface conformable with a plunger surface of the inlet valve plunger 212.

In one example, the armature 220 is a cross-hatched assembly of two subcomponents: an inner section 222 and an outer section 224. In some cases, the inner section 222 is guided on an outer surface of the barrel guide 232 and/or the armature guide 237. In some cases, the barrel guide 232 and/or the armature guide 237 includes the first surface (e.g., outer surface) conformable with the armature surface of the inner section 222 of the armature 220. In some cases, the outer section 224 provides a majority of the electromagnetic force of the armature 220. In some implementations, the armature 220 is a single piece armature. In some examples, the barrel guide 232 has a height 235 and a thickness 236. The height 235 is measured from the barrel seat 234.

In some embodiments, the armature 220 is electromagnetically coupled to the stator 240. The stator 240 is fixed within the pump sub-assembly 100. In some implementations, the bottom surface of the stator 240 is proximate to one end of the armature 220. The stator 240 further includes a coil 242 disposed proximate to the armature 220, wherein the coil 242 has an active state which drives the armature 220 to move to an upward position and an inactive state which permits the armature 220 to move to a downward position. As illustrated in FIGS. 2A and 2B, the armature 220 is at the upward position 226 and there is a gap 270 between the armature 220 and the pump barrel 230. In some examples, the gap 270 is an air gap.

In some designs, the height 235 of the barrel guide 232 is larger than a height 227 of the armature 220. In certain designs, the height 227 of the armature 220 is the height 227 of the armature 220 proximate to the inlet valve 210. In some designs, the height 235 of the barrel guide 232 is smaller than the height 227 of the armature 220. In certain designs, the difference between the height 235 of the barrel guide 232 and the height 227 of the armature 220 is small to provide guiding function while maintaining the gap 270 to be relatively small. In some examples, the difference between the height 235 of the barrel guide 232 and the height 227 of the armature 220 is no larger than 50% of the height 235 of the barrel guide 232. In some examples, the difference between the height 235 of the barrel guide 232 and the height 227 of the armature 220 is no larger than 20% of the height 235 of the barrel guide 232. In some examples, the difference between the height 235 of the barrel guide 232 and the height 227 of the armature 220 is no larger than 12% of the height 235 of the barrel guide 232.

In certain embodiments, the armature 220 includes an armature surface conformable to the armature guide 237 of the pump barrel 230, such that the armature 220 is guided by a surface of the armature guide 237 as the armature 220 moves between the upward position 226 and the downward position. The inlet valve plunger 212 includes a plunger surface conformable to the plunger guide 238 of the pump barrel 230, such that the inlet valve plunger 212 is guided by a surface of the plunger guide 238 as the inlet valve plunger moves with the armature 220 between the upward position and the downward position.

In some embodiments, the outlet check valve 250 is configured to allow fuel to flow through when fuel pressure is equal to or greater than a predetermined threshold. In some examples, an upper surface of the armature 220 is proximate to the inlet valve plunger stop 214 when the armature is at the upward position. In some implementations, the inlet valve 210 includes an inlet valve spring 216, where the inlet valve spring 216 includes a spring component. In some examples, the inlet valve spring 216 is configured to push the armature away from the inlet valve plunger stop 214 after the armature is at the upward position. In some implementations, the barrel seat 234 is generally conformable with a bottom surface of the armature 220. In some examples, the bottom surface of the armature 220 is proximate to the barrel seat 234 when the armature 220 is at the downward position.

During the output stage of the pump subassembly 200A or 200B, high-pressure fuel flows through the outlet check valve 250 and the fuel pressure in the pump chamber is reduced. The inlet valve spring 216 starts to push the armature 220 toward the barrel seat 234. When the armature 220 reaches the downward position, the inlet valve is opened and the outlet check valve 250 is closed.

Figure 2C:
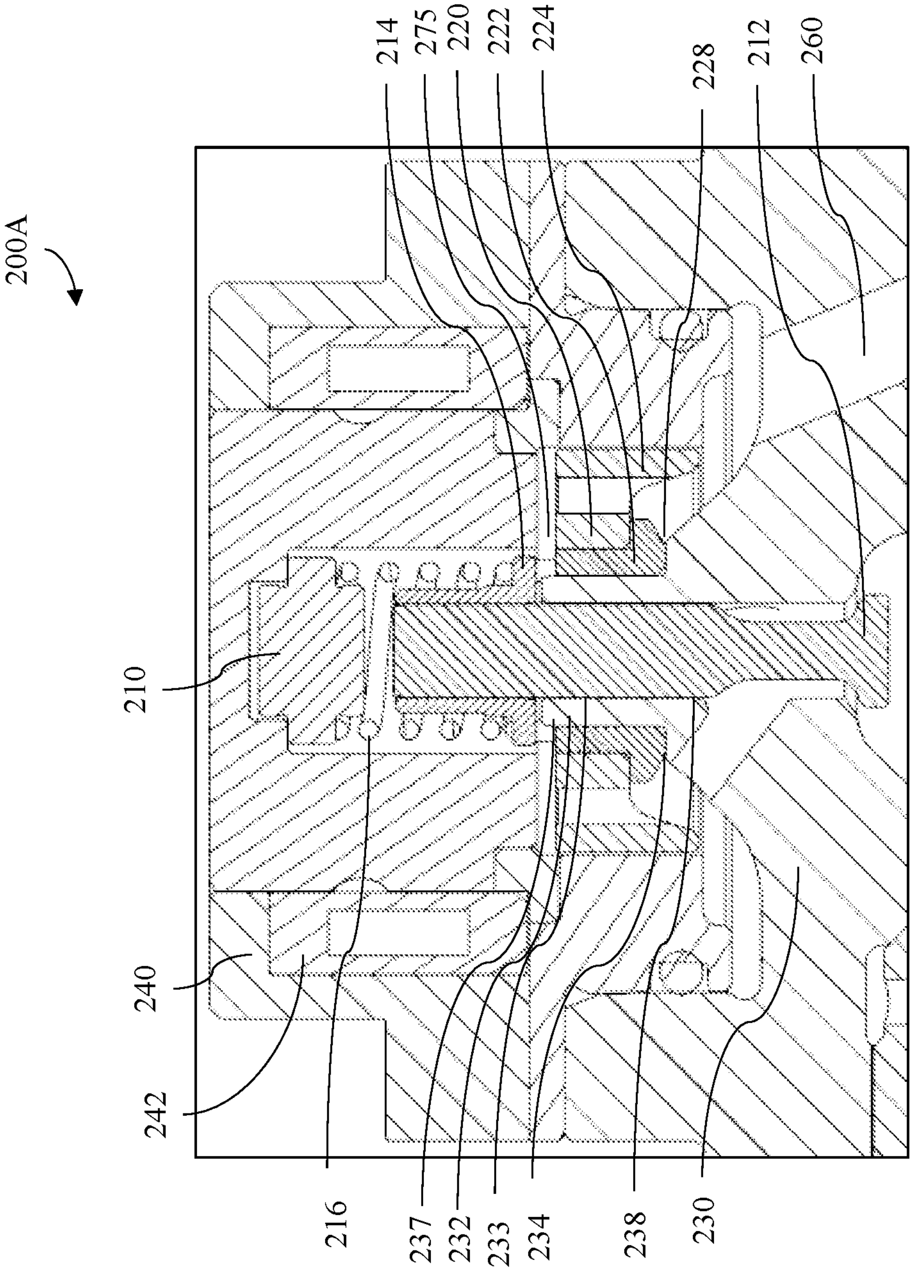
FIG. 2C depicts a cross-sectional schematic view of a pump sub-assembly with an inlet valve in an open state, in accordance with certain embodiments of the disclosure.
Figure 2D:
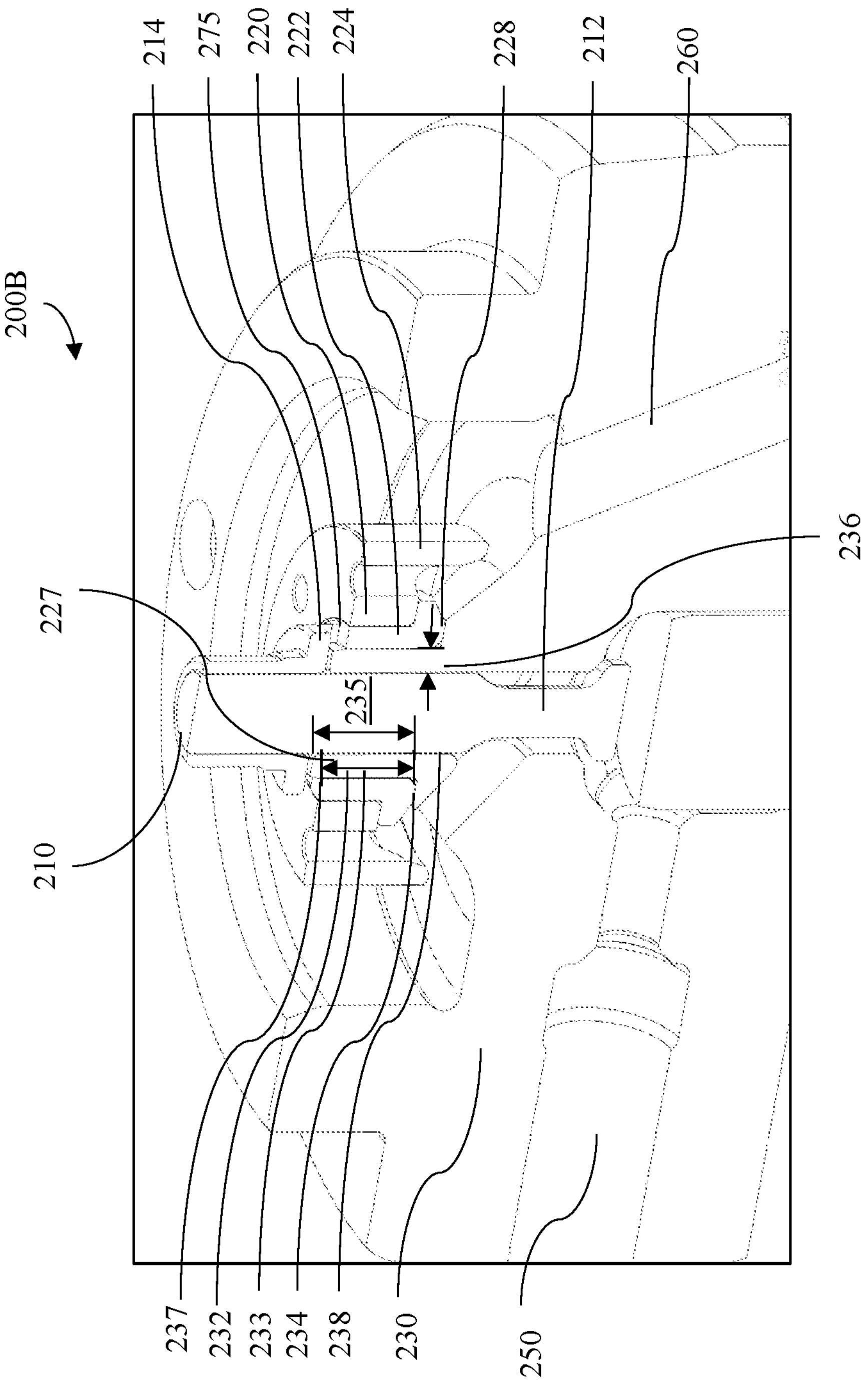
FIG. 2D depicts a perspective schematic view of a pump sub-assembly with an inlet valve in an open state, in accordance with certain embodiments of the disclosure.

FIG. 2C depicts a cross-sectional schematic view of a pump sub-assembly 200A with an inlet valve in an open state, in accordance with certain embodiments of the disclosure. FIG. 2D depicts a perspective schematic view of a pump sub-assembly 200B with an inlet valve in an open state, in accordance with certain embodiments of the disclosure. In FIG. 2C and FIG. 2D, the inlet valve 210 is opened to allow fuel to flow through.

In some embodiments, the armature 220 is electromagnetically coupled to the stator 240. The stator 240 is fixed within the pump sub-assembly 200A and 200B. In some implementations, the bottom surface of the stator 240 is proximate to one end of the armature 220. The stator 240 further includes a coil 242 disposed proximate to the armature 220, wherein the coil 242 has an active state which drives the armature 220 to move to an upward position and an inactive state which permits the armature 220 to move to a downward position 228. As illustrated in FIGS. 2C and 2D, the armature 220 is at the downward position 228 and there is a gap 275 between the armature 220 and the inlet valve plunger stop 214. In some examples, the gap 275 is an air gap.

In some designs, the height 235 of the barrel guide 232 is larger than a height 227 of the armature 220. In certain designs, the height 227 of the armature 220 is a height of the armature 220 proximate to the inlet valve 210. In some designs, the height 235 of the barrel guide 232 is smaller than the height 227 of the armature 220. In certain designs, the difference between the height 235 of the barrel guide 232 and the height 227 of the armature 220 is small to provide guiding function while maintaining a small gap 275. In some examples, the difference between the height 235 of the barrel guide 232 and the height 227 of the armature 220 is no larger than 50% of the height 235 of the barrel guide 232. In some examples, the difference between the height 235 of the barrel guide 232 and the height 227 of the armature 220 is no larger than 20% of the height 235 of the barrel guide 232. In some examples, the difference between the height 235 of the barrel guide 232 and the height 227 of the armature 220 is no larger than 12% of the height 235 of the barrel guide 232.

In certain embodiments, the armature 220 includes an armature surface conformable to the armature guide 237 of the pump barrel 230, such that the armature 220 is guided by a surface of the armature guide 237 as the armature 220 moves between the upward position 226 and the downward position. The inlet valve plunger 212 includes a plunger surface conformable to the plunger guide 238 of the pump barrel 230, such that the inlet valve plunger 212 is guided by a surface of the plunger guide 238 as the inlet valve plunger moves with the armature 220 between the upward position and the downward position.

In some embodiments, the outlet check valve 250 is configured to allow fuel to flow through when fuel pressure is equal to or greater than a predetermined threshold. In some examples, an upper surface of the armature 220 is proximate to the inlet valve plunger stop 214 when the armature is at the upward position. In some implementations, the inlet valve 210 includes an inlet valve spring 216, where the inlet valve spring 216 includes a spring component. In some examples, the inlet valve spring 216 is configured to push the armature away from the inlet valve plunger stop 214 after the armature is at the upward position. In some implementations, the barrel seat 234 is generally conformable with a bottom surface of the armature 220. In some examples, the bottom surface of the armature 220 is proximate to the barrel seat 234 when the armature 220 is at the downward position.

During the intake stage of the pump subassembly 200A and 200B, inlet fuel flows through inlet valve 210 into the pump. Initially, the armature 220 is at the downward position. Fuel under low pressure flows through inlet passage and the force of the low-pressure fuel into the flow passage 260 causes inlet valve plunger 212 to move longitudinally or axially away from inlet valve seat, compressing inlet valve spring 216. From flow passage 260, the low-pressure fuel flows into pump chamber 239. When the fuel accumulates in the pump chamber, the armature 220 is moving toward the inlet valve plunger stop 214 and the outlet check valve 250 remains closed. When the armature 220 is at the upward position (e.g., upward position 226 in FIG. 2A), the inlet valve 210 is closed, the fuel pressure is equal to or greater than a predetermined fuel threshold, and the pump subassembly 200A and 200B goes into an output stage.

Figure 3A:
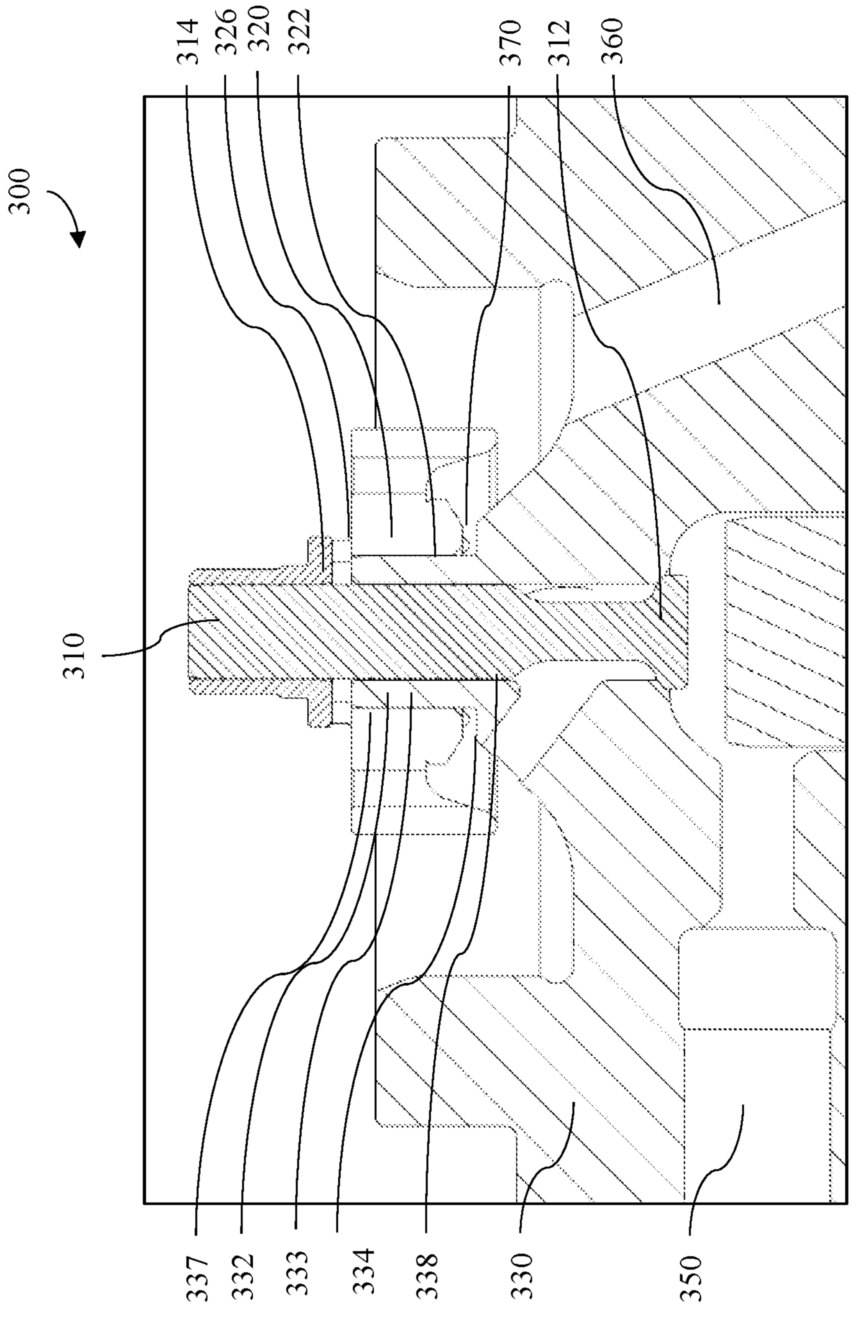
FIG. 3A depicts a cross-sectional schematic view of a pump sub-assembly, in accordance with certain embodiments of the disclosure.
Figure 3B:
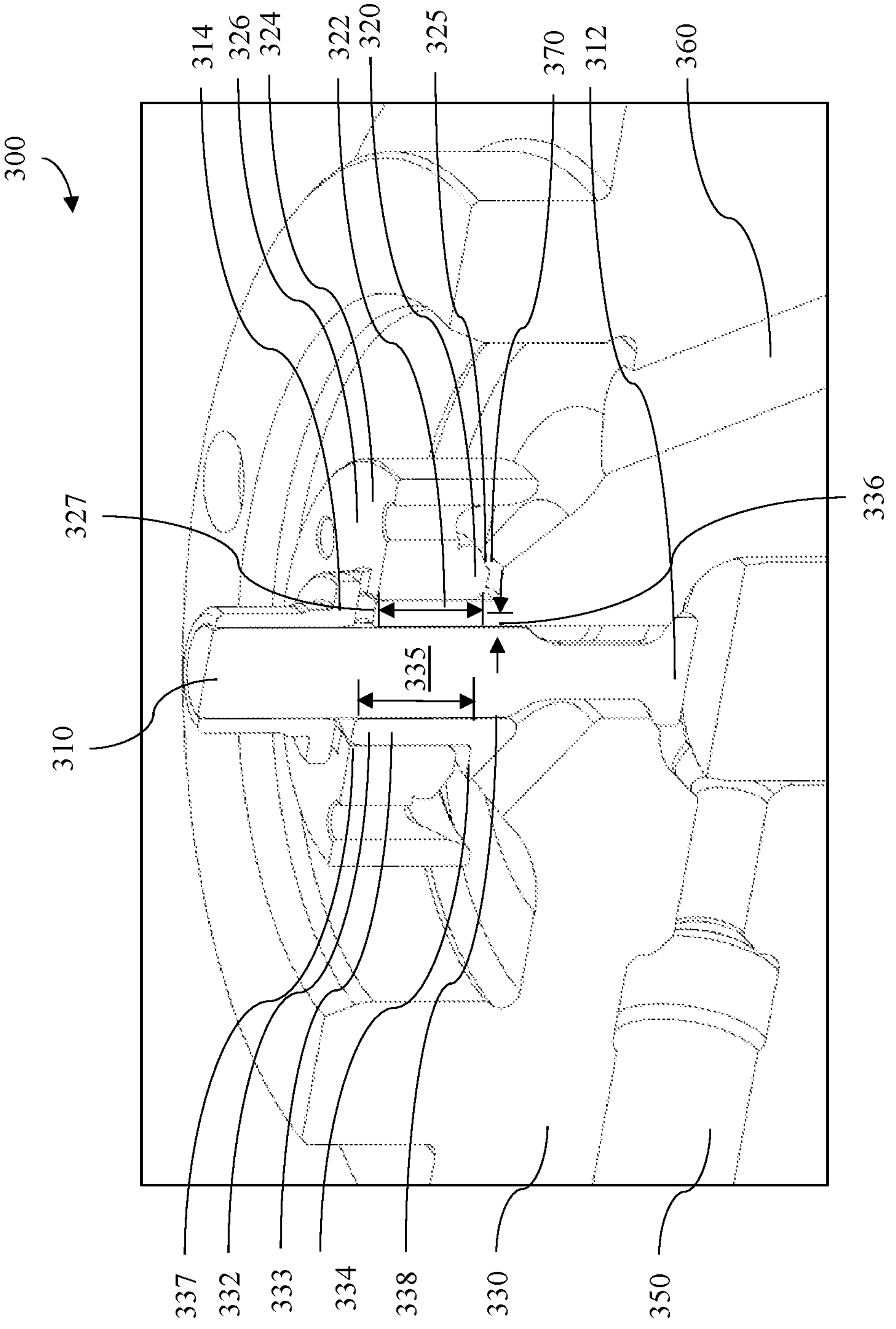
FIG. 3B depicts a perspective schematic view of a pump sub-assembly, in accordance with certain embodiments of the disclosure.

FIG. 3A depicts a cross-sectional schematic view of a pump sub-assembly 300, in accordance with certain embodiments of the disclosure. FIG. 3B depicts a perspective schematic view of a pump sub-assembly 300 with an inlet valve in a closed state, in accordance with certain embodiments of the disclosure. In some implementations, one or more components of the pump sub-assembly 300 can be optional. In some implementations, the pump sub-assembly 300 can include other components not illustrated in the diagram. In some embodiments, the pump sub-assembly 300 is a part of a high-pressure pump configured to generate fuel pressure approximate to 2500 bar. In the illustrated examples, the pump sub-assembly 300 includes an inlet valve 310, an armature 320, a pump barrel 330, an outlet check valve 350, and a flow passage 360.

The inlet valve 310 is configured to be closed to stop fuel from flowing through the inlet valve 310 and be opened to allow fuel to flow through. In some implementations, the inlet valve 310 includes an inlet valve plunger 312, an inlet valve plunger stop 314. In some examples, the inlet valve 310 is adjacent to a stator (not illustrated), where the stator comprises an electromagnetic component (e.g., coil, solenoid, etc.)

In some embodiments, the pump barrel 330 includes a barrel guide 332 and a barrel seat 334. In some examples, the barrel guide 332 includes a protrusion 333 extended from the barrel seat 334. In some cases, the barrel guide 332 and/or the protrusion 333 includes an armature guide 337 that is configured to guide a motion of the armature. In some cases, the barrel guide 332 and/or the armature guide 337 includes a first surface conformable with an armature surface of the armature 320. In some cases, the barrel guide 332 and the protrusion 333 includes a plunger guide 338 that is configured to guide a motion of the inlet valve plunger 312. In some cases, the barrel guide 332 and/or the plunger guide 338 includes a second surface conformable with a plunger surface of the inlet valve plunger 312. In some examples, the barrel guide 332 and/or the armature guide 337 has a cylindrical outer surface. In certain examples, the barrel guide 332 and/or the plunger guide 338 has a cylindrical inner surface.

In one example, the armature 320 is a one-piece armature. In some cases, the armature 320 is guided on an outer surface of the barrel guide 332 and/or the armature guide 337. In some cases, the barrel guide 332 and/or the armature guide 337 includes the first surface (e.g., outer surface) conformable with the armature surface 322 of the armature 320.

In some embodiments, the armature 320 is at an upward position when the inlet valve 310 is closed and at a downward position when the inlet valve 310 is opened. As illustrated in FIGS. 3A and 3B, the armature 320 is at the upward position 326, where the upper surface of the armature 320 is proximate to the inlet valve plunger stop 314. In some examples, there is a gap 370 between the armature 320 and the pump barrel 330 when the armature 320 is at the upward position 326. In certain examples, there is a gap 370 between the armature 320 and the barrel seat 334 when the armature 320 is at the upward position 326. In some examples, the gap 370 is an air gap.

In some designs, the height 335 of the barrel guide 332 is larger than a height 327 of the armature 320. In certain designs, the height 327 of the armature 320 is a height of the armature 320 proximate to the inlet valve 310. In some designs, the height 335 of the barrel guide 332 is smaller than the height 327 of the armature 320. In certain designs, the difference between the height 335 of the barrel guide 332 and the height 327 of the armature 320 is small to provide guiding function while maintaining a small gap 375. In some examples, the difference between the height 335 of the barrel guide 332 and the height 327 of the armature 320 is no larger than 50% of the height 335 of the barrel guide 332. In some examples, the difference between the height 335 of the barrel guide 332 and the height 327 of the armature 320 is no larger than 20% of the height 335 of the barrel guide 332. In some examples, the difference between the height 335 of the barrel guide 332 and the height 327 of the armature 320 is no larger than 12% of the height 235 of the barrel guide 332. In some variations, the height 335 of the barrel guide 332 is measured from the barrel seat 334 to the top of the barrel guide. In certain variations, the barrel seat 334 refers to a generally flat surface where the protrusion 333 is extended from.

In certain embodiments, the armature 320 includes an armature surface conformable to the armature guide 337 of the pump barrel 330, such that the armature 320 is guided by a surface of the armature guide 337 as the armature 320 moves between the upward position 326 and the downward position. In certain examples, the armature 320 includes a top surface 324 and an opposing bottom surface 325. In some examples, the inlet valve plunger 312 includes a plunger surface conformable to the plunger guide 338 of the pump barrel 330, such that the inlet valve plunger 312 is guided by a surface of the plunger guide 338 as the inlet valve plunger moves with the armature 320 between the upward position and the downward position.

In some embodiments, the outlet check valve 350 is configured to allow fuel to flow through when fuel pressure is equal to or greater than a predetermined threshold. In some examples, the top surface 324 of the armature 320 is proximate to the inlet valve plunger stop 314 when the armature is at the upward position 326. In some implementations, the inlet valve 310 includes an inlet valve spring 316, where the inlet valve spring 316 includes a spring component. In some examples, the inlet valve spring 316 is configured to push the armature away from the inlet valve plunger stop 314 after the armature 320 is at the upward position 326. In some implementations, the barrel seat 334 is generally conformable with a bottom surface 325 of the armature 320. In some examples, the bottom surface of the armature 320 is proximate to the barrel seat 334 when the armature 320 is at the downward position.

During the output stage of the pump subassembly 300, high-pressure fuel flows through the outlet check valve 350 and the fuel pressure in the pump chamber is reduced. The inlet valve spring 316 starts to push the armature 320 toward the barrel seat 334. When the armature 320 reaches the downward position, the inlet valve is opened and the outlet check valve 350 is closed.

In some examples, the top surface 324 (e.g., an upper surface) of the armature 320 is proximate to the inlet valve plunger stop 314 when the armature is at the upward position 326. In some implementations, the inlet valve 310 includes an inlet valve spring 316, where the inlet valve spring 316 includes a spring component. In some examples, the inlet valve spring 316 is configured to push the armature away from the inlet valve plunger stop 314 after the armature is at the upward position. In some implementations, the barrel seat 334 is generally conformable with the bottom surface 325 of the armature 320. In some examples, the bottom surface of the armature 320 is proximate to the barrel seat 334 when the armature 320 is at the downward position.

During the intake stage of the pump subassembly 300, inlet fuel flows through inlet valve 310 into the pump. Initially, the armature 320 is at the downward position. Fuel under low pressure flows through inlet passage and the force of the low-pressure fuel into the flow passage 360 causes inlet valve plunger 312 to move longitudinally or axially away from inlet valve seat, compressing inlet valve spring 316. From flow passage 360, the low-pressure fuel flows into pump chamber 339. When the fuel accumulates in the pump chamber, the armature 320 is moving toward the inlet valve plunger stop 314 and the outlet check valve 350 remains closed. When the armature 320 is at the upward position 326, the inlet valve 310 is closed, the fuel pressure is equal to or greater than a predetermined fuel threshold, and the pump subassembly 300 goes into an output stage.

Various modifications and additions can be made to the exemplary embodiments discussed without departing from the scope of the present invention. For example, while the embodiments described above refer to specific features, the scope of this invention also includes embodiments having different combinations of features and embodiments that do not include all of the above described features.

What is claimed is:

1. A high-pressure pump for an engine, the pump comprising:

an inlet valve configured to receive fuel;

an armature coupled to the inlet valve and configured to actuate the inlet valve, the armature including an armature surface and a height along the armature surface measured from a bottom surface of the armature to a top surface of the armature; and a pump barrel comprising a barrel guide and a barrel seat, the barrel guide comprising a protrusion having a height extending from the barrel seat through the bottom surface from which the height of the armature is measured to the top surface of the armature and configured to guide a motion of the armature from a closed position of the inlet valve in which the bottom surface of the armature is supported on the seat to an open position in which an air gap is formed between the bottom surface of the armature and the seat.

2. The high-pressure pump of claim 1, wherein the barrel guide comprises a first surface conformable with the armature surface of the armature.

3. The high-pressure pump of claim 2, wherein the inlet valve comprises an inlet plunger; and wherein the barrel guide comprises a second surface conformable with a plunger surface of the inlet valve plunger.

4. The high-pressure pump of claim 3, wherein the inlet valve comprises an open state allowing fuel to run through the inlet valve and a closed state not allowing fuel to run through the inlet valve;

wherein the armature is at a downward position when the inlet valve is at the open state and at an upward position when the inlet valve is at the closed state; and wherein the upward position is closer to a top of the high-pressure pump than the downward position.

5. The high-pressure pump of claim 4, wherein the inlet valve comprises an inlet plunger stop; and wherein the upper surface of the armature is proximate to the inlet plunger stop when the armature is at the upward position.

6. The high-pressure pump of claim 5, wherein the inlet valve comprises an inlet valve spring;

wherein the inlet valve spring comprises a spring component; and wherein the inlet valve spring is configured to push the armature away from the inlet plunger stop after the armature is at the upward position.

7. The high-pressure pump of claim 4, wherein the barrel seat is generally conformable with the bottom surface of the armature from which the height of the armature is measure; and wherein the height of the protrusion extends beyond the height of the armature.

8. The high-pressure pump of claim 1, wherein the armature comprises an electromagnetic component.

9. The high-pressure pump of claim 1, further comprising:

a stator configured to affect a motion of the armature;

wherein the stator comprises an electromagnetic component.

10. The high-pressure pump of claim 1, further comprising:

an outlet check valve assembly configured to allow fuel to flow through when fuel pressure is equal to or greater than a predetermined fuel threshold.

11. A high-pressure pump for an engine, the pump comprising:

an inlet valve configured to receive fuel;

an armature coupled to the inlet valve and configured to actuate the inlet valve, the armature comprising an armature surface and a height along the armature surface measured from a bottom surface of the armature to a top surface of the armature; and a pump barrel comprising a barrel guide and a barrel seat, the barrel guide comprising a first surface conforming to a surface of the armature surface, the first surface having a height extending from the barrel seat through the bottom surface from which the height of the armature is measured to the top surface of the armature and configured to guide a motion of the armature from a closed position of the inlet valve in which the bottom surface of the armature is supported on the seat to an open position in which an air gap is formed between the bottom surface of the armature and the seat.

12. The high-pressure pump of claim 11, wherein the barrel guide comprises a protrusion, wherein the protrusion has a height larger than the height of the armature.

13. The high-pressure pump of claim 12, wherein the inlet valve comprises an inlet plunger; and wherein the barrel guide comprises a second surface conformable with a plunger surface of the inlet valve plunger.

14. The high-pressure pump of claim 13, wherein the inlet valve comprises an open state allowing fuel to run through the inlet valve and a closed state not allowing fuel to run through the inlet valve;

wherein the armature is at a downward position when the inlet valve is at the open state and at an upward position when the inlet valve is at the closed state; and wherein the upward position is closer to a top of the high-pressure pump than the downward position.

15. The high-pressure pump of claim 14, wherein the inlet valve comprises an inlet plunger stop; and wherein the upper surface of the armature is proximate to the inlet plunger stop when the armature is at the upward position.

16. The high-pressure pump of claim 15, wherein the inlet valve comprises an inlet valve spring;

wherein the inlet valve spring comprises a spring component; and wherein the inlet valve spring is configured to push the armature away from the inlet plunger stop after the armature is at the upward position.

17. The high-pressure pump of claim 14, wherein the barrel seat is generally conformable with the bottom surface of the armature from which the height of the armature is measure; and wherein the height of the protrusion extends beyond the height of the armature.

18. The high-pressure pump of claim 11, wherein the armature comprises an electromagnetic component.

19. The high-pressure pump of claim 11, further comprising:

a stator configured to affect a motion of the armature;

wherein the stator comprises an electromagnetic component.

20. The high-pressure pump of claim 11, further comprising:

an outlet check valve assembly configured to allow fuel to flow through when fuel pressure is equal to or greater than a predetermined fuel threshold.

* * * * *